United States Patent
Kim

(10) Patent No.: US 9,466,298 B2
(45) Date of Patent: Oct. 11, 2016

(54) WORD DETECTION FUNCTIONALITY OF A MOBILE COMMUNICATION TERMINAL

(75) Inventor: Nam-Young Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1143 days.

(21) Appl. No.: 12/717,487

(22) Filed: Mar. 4, 2010

(65) Prior Publication Data

US 2011/0015926 A1 Jan. 20, 2011

(30) Foreign Application Priority Data

Jul. 15, 2009 (KR) ........................ 10-2009-0064663

(51) Int. Cl.
*G10L 15/26* (2006.01)
*G10L 15/08* (2006.01)

(52) U.S. Cl.
CPC .......... *G10L 15/26* (2013.01); *G10L 2015/088* (2013.01)

(58) Field of Classification Search
CPC ....................................................... G10L 15/26
See application file for complete search history.

(56) References Cited

U.S. PATENT DOCUMENTS

| | | | | |
|---|---|---|---|---|
| 5,787,421 | A * | 7/1998 | Nomiyama | |
| 6,411,683 | B1 * | 6/2002 | Goldberg et al. | 379/88.01 |
| 7,542,902 | B2 * | 6/2009 | Scahill et al. | 704/251 |
| 8,126,712 | B2 * | 2/2012 | Mukaigaito et al. | 704/251 |
| 2006/0053010 | A1 * | 3/2006 | Chapman et al. | 704/235 |
| 2008/0162454 | A1 * | 7/2008 | Lundell et al. | 707/5 |
| 2008/0172359 | A1 * | 7/2008 | Lundell et al. | 707/3 |
| 2008/0235018 | A1 * | 9/2008 | Eggen et al. | 704/251 |
| 2008/0300872 | A1 * | 12/2008 | Basu et al. | 704/235 |
| 2009/0292526 | A1 * | 11/2009 | Harari et al. | 704/9 |
| 2009/0327263 | A1 * | 12/2009 | Maghoul | 707/5 |
| 2010/0246784 | A1 * | 9/2010 | Frazier et al. | 379/88.13 |
| 2012/0035930 | A1 * | 2/2012 | Gilbert et al. | 704/251 |

FOREIGN PATENT DOCUMENTS

| | | |
|---|---|---|
| JP | 2002-297645 A | 10/2002 |
| KR | 10-2004-0066440 A | 7/2004 |

OTHER PUBLICATIONS

Matt Cutts, "New Google UI feature: Plus Box", posted Dec. 9, 2006, at https://www.mattcutts.com/blog/new-google-ui-feature-plus-box/.*
Internet Movie Database, web archive of http://us.imdb.com/Help/introduction, captured on Jun. 12, 2001 by archive.org, available at: https://web.archive.org/web/20010612222441/http://us.imdb.com/Help/introduction.*
Korean Office Action dated May 27, 2015 for Korean Application No. 10-2009-0064663, 5 pages.

* cited by examiner

*Primary Examiner* — Brian Albertalli
(74) *Attorney, Agent, or Firm* — Fish & Richardson P.C.

(57) ABSTRACT

Voice communication by first and second users in a voice communication session that facilitates communication between a first device through which a first user communicates and a second device through which a second user communicates is enabled. Words spoken in the voice communication session between the first device and the second device are monitored. Presence of one or more key words as a subset of less than all of the monitored spoken in the voice communication session is determined from the monitored words spoken in the voice communication session. The one or more key words are displayed on a display screen.

23 Claims, 10 Drawing Sheets

WORD DETECTION FUNCTIONALITY OF A MOBILE COMMUNICATION TERMINAL

CROSS-REFERENCE TO A RELATED APPLICATION

Pursuant to 35 U.S.C. §119(a), this application claims the benefit of the earlier filing date and right of priority to Korean Application No. 10-2009-0064663, filed on Jul. 15, 2009, the contents of which is incorporated by reference herein in its entirety.

BACKGROUND

Mobile devices can be used to provide wireless communication between users. In particular, a user of a mobile device can plane a telephone call to a landline or to another user of a mobile device. As mobile device capability has advanced in recent years, mobile devices have increasingly become able to provide functionality in addition to wireless communication. For example, some mobile devices provide internet access and other functionality.

SUMMARY

In general, in some aspects, a method includes enabling voice communication by first and second users in a voice communication session that facilitates communication between a first device through which a first user communicates and a second device through which a second user communicates. The method also includes monitoring words spoken in the voice communication session between the first device and the second device and determining, from the monitored words spoken in the voice communication session, presence of one or more key words as a subset of less than all of the monitored spoken in the voice communication session. The method further includes displaying, on a display screen of the first device, the one or more key words.

This and other implementations can optionally include one or more of the following features, which also may optionally be in any combination. For example, enabling voice communication can include initiating the voice communication session between the first user using the first device and the second user using the second device. Enabling voice communication can include receiving a call initiated using the second device. Monitoring words spoken in the voice communication session between the first device and the second device can include monitoring, by the first device, words spoken by the first user and communicated through the first device during the voice communication session. Monitoring words spoken in the voice communication session between the first device and the second device can include monitoring, by the first device, words spoken by the second user and communicated through the second device during the voice communication session.

In addition, determining the one or more key words can include monitoring the number of instances a word is detected and displaying the one or more key words can include displaying one or more words spoken by the second user and communicated through the second device on the display screen of the first device. The method may additionally include storing, during the voice communication session, an indication of the determined one or more key words and accessing, after the voice communication session has ended, the stored indication of the determined one or more key words. Displaying the one or more key word can include displaying information based on the accessed indication of the determined one or more key words. The method can also include receiving, in response to the displaying of the one or more key words, a user selection of a first key word, accessing, based on the user selection of the first key word, information associated with the first key word, and displaying, on the display screen, the accessed information associated with the first key word.

Moreover, the method can include receiving, in response to the displaying of the one or more key words, an indication of a user selection of a first key word, sending, based on the received indication of the user selection of the first key word and over a communication network, a request for content associated with the first key word, retrieving, from across the communication network, information associated with the first key word, and displaying, on the display screen, the retrieved information associated with the first key word. The method can further include accessing, from a computer-readable storage medium, a list of stored words. Determining the presence of the one or more key words can include comparing the monitored words spoken in the communication session between the first device and the second device with at least some of the words in the list of stored words accessed from the computer-readable storage medium.

Further, determining the presence of the one or more key words can include counting the number of occurrences of the monitored words spoken in the communication session between the first device and the second device and identifying, based on the counted number of occurrences of the monitored words, a subset of the monitored words as the one or more key words. Finally, the method can include organizing, based on the counted number of occurrences of the monitored words, the identified one or more key words. Displaying the one or more key words can include displaying, based on the organizing of the identified one or more key words, the one or more key words in an order from most occurrences to least occurrences.

In other implementations, some aspects include a mobile communication terminal. The terminal includes a communication unit configured to enable voice communication by first and second users in a voice communication session that facilitates communication between a first device through which a first user communicates and a second device through which a second user communicates. The terminal also includes a display a controller configured. The controller is configured to monitor words spoken in the voice communication session between the first device and the second device, determine, from the monitored words spoken in the voice communication session, presence of one or more key words as a subset of less than all of the monitored spoken in the voice communication session, and enable display of the one or more key words on the display.

This and other implementations can optionally include one or more of the following features, which also may optionally be in any combination. For example, to enable voice communication, the communication unit can be configured to initiate the voice communication session between the first user using the first device and the second user using the second device. To enable voice communication, the communication unit can be configured to receive a call initiated using the second device. To monitor words spoken in the voice communication session between the first device and the second device, the controller can be configured to monitor words spoken by the first user and communicated through the first device during the voice communication session. To monitor words spoken in the voice communication session between the first device and the second device, the controller can be configured to monitor words spoken by the second user and communicated through the second device during the voice communication session.

Also, to determine the one or more key words, the controller can be configured to monitor the number of instances a word is detected and display the one or more key words includes displaying one or more words spoken by the second user and communicated through the second device on the display screen of the first device. The terminal can also include a computer-readable storage medium. The controller can be configured to store, during the voice communication session, an indication of the determined one or more key words, access, after the voice communication session has ended, the stored indication of the determined one or more key words, and enable display, on the display, of information based on the accessed indication of the determined one or more key words. The controller can be configured to receive, in response to the displaying of the one or more key words, a user selection of a first key word, access, based on the user selection of the first key word, information associated with the first key word, and enable display, on the display, of the accessed information associated with the first key word.

Further, the controller can be configured to receive, in response to the displaying of the one or more key words, an indication of a user selection of a first key word, send, based on the received indication of the user selection of the first key word and over a communication network, a request for content associated with the first key word, retrieve, from across the communication network, information associated with the first key word, and enable display, on the display, of the retrieved information associated with the first key word.

The terminal can further include a computer-readable storage medium storing a list of words. To determine the presence of the one or more key words, the controller can be configured to compare the monitored words spoken in the communication session between the first device and the second device with at least some of the words in the list of words stored in the computer-readable storage medium. To determine one or more key words, the controller can be configured to count the number of occurrences of the monitored words spoken in the communication session between the first device and the second device and identify, based on the counted number of occurrences of the monitored words, a subset of the monitored words as the one or more key words. The controller can be configured to organize, based on the counted number of occurrences of the monitored words, the identified one or more key words and to enable display of the one or more key words, the controller can be configured to enable display, based on the organizing of the identified one or more key words, of the one or more key words in an order from most occurrences to least occurrences.

The foregoing and other objects, features, aspects and advantages will become more apparent from the following detailed description when taken in conjunction with the accompanying drawings.

DETAILED DESCRIPTION

Figure 1:
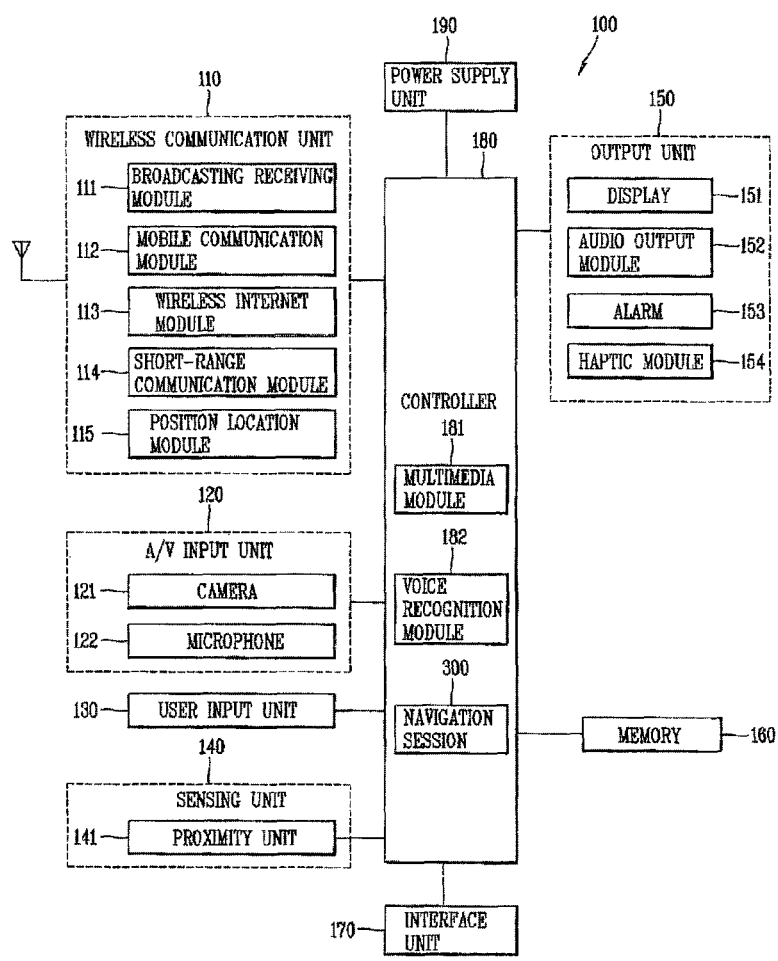
FIG. 1 is a schematic block diagram showing a configuration of a mobile communication terminal.

FIG. 1 is a schematic block diagram showing a configuration of a mobile communication terminal employing an image display apparatus according to an exemplary embodiment. The mobile communication terminal 100 may be implemented in various forms, such as mobile phones, smart phones, notebook computers, digital broadcast terminals, Personal Digital Assistants (PDAs), or Portable Multimedia Player (PMPs).

As shown in FIG. 1, the mobile communication terminal 100 includes a wireless communication unit 110, an Audio/Video (A/V) input unit 120, a user input unit 130, a sensing unit 140, an output unit 150, a memory 160, an interface unit 170, a controller 180, and a power supply unit 190. FIG. 1 shows the mobile communication terminal 100 having various components, but it is understood that implementing all of the illustrated components is not a requirement. In particular, various implementations of the mobile communication terminal 100 may include greater or fewer components in configurations other than the configuration illustrated by FIG. 1.

The wireless communication unit 110 can include one or more components that enable radio communication between the mobile communication terminal 100 and a wireless communication system or a network in which the mobile communication terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server or other network entity (not shown) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program, or a broadcast service provider. The broadcast signal may include a TV broadcast signal, a radio broadcast signal, a data broadcast signal, or other signals. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, broadcast associated information may be implemented according to various formats, such as electronic program guide (EPG) of digital multimedia broadcasting (DMB), and electronic service guide (ESG) of digital video broadcast-handheld (DVB-H).

The broadcast receiving module 111 may be configured to receive signals broadcast by using various types of broadcast systems. In particular, the broadcast receiving module 111 may receive a digital broadcast using a digital broadcast system, such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), or other broadcast systems. The broadcast receiving module 111 may be configured to be suitable for broadcast systems that provide a broadcast signal as well as the above-mentioned digital broadcast systems. Broadcast signals and/or broadcast-associated information received via the broadcast receiving module 111 may be stored in the memory 160.

The mobile communication module 112 may transmit and receive radio signals to and from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the terminal. Here, as the wireless Internet technique, a wireless local area network (WLAN), Wi-Fi, wireless broadband (WiBro), world interoperability for microwave access (Wi-MAX), high speed downlink packet access (HSDPA), may be used. The short-range communication module 114 is a module for supporting short range communications. Some examples of short-range communication technology include Bluetooth™, Radio Frequency IDentification (RFID), Infrared Data Association (IrDA), Ultra-WideBand (UWB), and ZigBee™.

The location information module 115 is a module for checking or acquiring a location (or position) of the mobile communication terminal or vehicle in which the mobile communication terminal is located. For example, the location information module 115 may be embodied using a Global Positioning System (GPS) module that receives location information from a plurality of satellites. Here, the location information may include coordinate information represented by latitude and longitude values. For example, the GPS module may measure time and distance with respect to three or more satellites so as to calculate a current location of the mobile communication terminal 100 according to trigonometry based on the measured time and distances. A method of acquiring distance and time information from three satellites and performing error correction with a single satellite may be used. In particular, the GPS module may acquire time and three-dimensional speed information as well as a latitude, longitude, and altitude from the location information received from the satellites. A Wi-Fi position system and/or hybrid positioning system may be used as the location information module 115.

The A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on the display unit 151 (or other visual output device). The image frames processed by the camera 121 may be stored in the memory 160 (or other storage medium) or transmitted via the wireless communication unit 110. Two or more cameras 121 may be provided according to the configuration of the mobile communication terminal.

The microphone 122 may receive sounds via a microphone in a phone call mode, a recording mode, a voice recognition mode, or other modes, and can process the received sounds into audio data. In implementations using mobile telephone systems, the processed audio data may be converted for output into a format transmittable to a mobile communication base station (or other network entity) via the mobile communication module 112. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal 100. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, or other input mechanisms. In particular, when the touch pad is overlaid on the display unit 151 in a layered manner, it may form a touch screen.

The sensing unit 140 detects a current status (or state) of the mobile communication terminal 100, such as an opened or closed state of the mobile communication terminal 100, a location of the mobile communication terminal 100, the presence or absence of user contact with the mobile communication terminal 100 (i.e., touch inputs), the orientation of the mobile communication terminal 100, an acceleration or deceleration movement and direction of the mobile communication terminal 100, or other input mechanisms, so as to generate commands or signals for controlling the operation of the mobile communication terminal 100. For example, when the mobile communication terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (serves as an interface by which at least one external device may be connected with the mobile communication terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, or earphone ports. Here, the identification module may be a memory chip (or other element with memory or storage capabilities) that stores various information for authenticating user's authority for using the mobile communication terminal 100. This information may include a user identity module (UIM), a subscriber identity module (SIM) a universal subscriber identity module (USIM), or other information.

In addition, the device having the identification module (referred to as the 'identifying device', hereinafter) may take the form of a smart card. Accordingly, the identifying device may be connected with the mobile communication terminal 100 via a port or other connection means. The interface unit 170 may be used to receive inputs (e.g., data, information or power) from an external device and transfer the received inputs to one or more elements within the mobile communication terminal 100 or may be used to transfer data between the mobile communication terminal and an external device.

The output unit 150 is configured to provide outputs in a visual, audible, and/or tactile manner (e.g., audio signal, video signal, alarm signal, or vibration signal). The output unit 150 may include the display unit 151, an audio output module 152, an alarm unit 153, or other units.

The display unit 151 may display information processed in the mobile communication terminal 100. For example, when the mobile communication terminal 100 is in a phone call mode, the display unit 151 may display a User Interface (UI) or a Graphic User Interface (GUI) associated with a call or other communication (such as text messaging or multimedia file downloading). When the mobile communication terminal 100 is in a video call mode or image capturing mode, the display unit 151 may display a captured image and/or a received image, or a UI or GUI that shows videos or images and functions related thereto.

The display unit 151 may include at least one of a Liquid Crystal Display (LCD), a Thin Film Transistor-LCD (TFT-LCD), an Organic Light Emitting Diode (OLED) display, a flexible display, or a three-dimensional (3D) display. The mobile communication terminal 100 may include two or more display units (or other display means) according to its particular desired functionality. For example, the mobile communication terminal may include both an external display unit (not shown) and an internal display unit (not shown).

When the display unit 151 and the touch pad are overlaid in a layered manner to form a touch screen, the display unit 151 may function as both an input device and an output device. The touch sensor may, for example, have the form of, for example, a touch film, a touch sheet, or a touch pad. In some cases, touch sensors (or touch screens) can operate without an actual physical contact. For example, touch screens operating on changed capacitance or other electrical characteristics may operate by the nearby presence of a finger or object with or without physical contact with the screen. As such, a "touch screen" may not actually require a touch for operation.

The touch sensor may be configured to convert the pressure applied to a particular portion of the display unit 151 or a change in capacitance or other electrical characteristic generated at a particular portion of the display unit 151 into an electrical input signal. The touch sensor may be configured to detect a touch input pressure as well as a touch input position and a touch input area. When there is a touch input with respect to the touch sensor, the corresponding signal is sent to a touch controller (not shown). The touch controller processes the signal(s) and transmits corresponding data to the controller 180. Accordingly, the controller 180 can recognize a touched region of the display unit 151.

Figure 2:
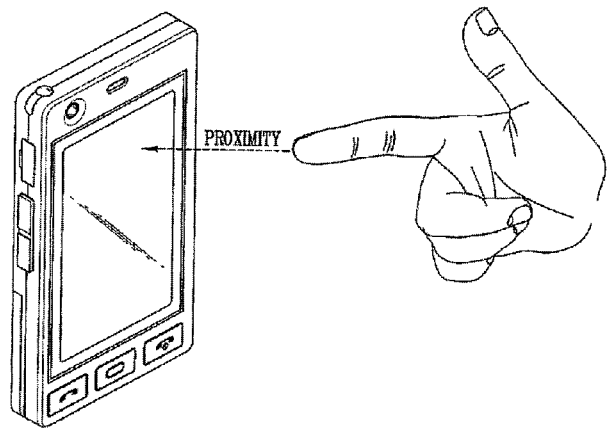
FIG. 2 illustrates a proximity touch.

A proximity sensor 141 of the mobile communication terminal 100 will now be described with reference to FIG. 2. FIG. 2 illustrates a proximity touch. A proximity touch can, for example, refer to recognition of the pointer positioned to be close to the touch screen without being in contact with the touch screen. In addition, a proximity touch can also refer to other touch screen functionality, as discussed above.

The proximity sensor 141 may be may be disposed within the mobile communication terminal covered by the touch screen or near the touch screen. The proximity sensor 141 can refer to a sensor for detecting the presence or absence of an object that accesses a certain detection surface or an object that exists nearby by using the force of electromagnetism or infrared rays without a mechanical contact. Thus, the proximity sensor 141 can have a longer life span than a contact type sensor and can be utilized for various purposes.

Examples of a proximity sensor 141 include a transmission type photoelectric sensor, a direct reflection type photoelectric sensor, a mirror-reflection type photo sensor, an RF oscillation type proximity sensor, a capacitance type proximity sensor, a magnetic proximity sensor, or an infrared proximity sensor. When the touch screen is an electrostatic type touch screen, an approach of the pointer can be detected based on a change in an electric field according to the approach of the pointer. For example, the touch sensor may be classified as a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch.' In this case, the pointer being in the state of the proximity touch can indicate that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, or a proximity touch movement state), and information corresponding to the detected proximity touch operation and the proximity touch pattern can be outputted to the touch screen.

The audio output module 152 may output audio data received from the wireless communication unit 110 or stored in the memory 160 in various modes. The modes may include a call signal reception mode, a call mode, a record mode, a voice recognition mode, a broadcast reception mode, or other modes. Also, the audio output module 152 may provide audible outputs related to a particular function (e.g., a call signal reception sound or a message reception sound) performed in the mobile communication terminal 100. The audio output module 152 may include a receiver, a speaker, or a buzzer.

The alarm unit 153 outputs a signal for informing a user about an occurrence of an event of the mobile communication terminal 100. Events generated in the mobile communication terminal may include receipt of a call, receipt of a message, or received key or touch input. In addition to video or audio signals, the alarm unit 153 may output signals in a different manner, for example, to inform a user about an occurrence of an event. The video or audio signals may be also outputted via the audio output module 152, so the display unit 151 and the audio output module 152 may be classified as parts of the alarm unit 153.

A haptic module 154 generates various tactile effects the user may feel, such as, for example vibration. The strength and pattern of the haptic module 154 can be controlled. For example, different vibrations may be combined to be outputted or sequentially outputted. Besides vibration, the haptic module 154 may generate various other tactile effects. The generated effects can include stimulation with a pin arrangement moving vertically with respect to a contact skin, a spray force or suction force of air through a jet orifice or a suction opening, a contact on the skin, a contact of an electrode, electrostatic force, and the sense of cold or warmth using an element that can absorb or generate heat. In addition, the haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile communication terminal 100.

The memory 160 may store software programs used for the processing and controlling operations performed by the controller 180, or may temporarily store data (e.g., a phonebook, messages, still images, or video) that are inputted or outputted. In addition, the memory 160 may store data regarding various patterns of vibrations and audio signals outputted when a touch is inputted to the touch screen.

The memory 160 can be implemented using any type of suitable storage medium, such as, for example, a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile communication terminal 100 may be operated in relation to a web storage device that performs the storage function of the memory 160 over the Internet.

The interface unit 170 serves as an interface with every external device connected with the mobile communication terminal 100. For example, the external devices may transmit data to an external device, receive and transmit power to each element of the mobile communication terminal 100, or transmit internal data of the mobile communication terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, or earphone ports.

The identification module may be a chip that stores various information for authenticating the authority of using the mobile communication terminal 100. This information may include a UIM, a SIM a USIM, or other information. In addition, the device having the identification module (referred to as 'identifying device', hereinafter) may take the form of a smart card. Accordingly, the identifying device may be connected with the mobile communication terminal 100 via a port. The interface unit 170 may be used to receive inputs (e.g., data, information, or power) from an external device and transfer the received inputs to one or more elements within the mobile communication terminal 100 or may be used to transfer data between the mobile communication terminal and an external device.

When the mobile communication terminal 100 is connected with an external cradle, the interface unit 170 may serve as a passage to allow power from the cradle to be supplied therethrough to the mobile communication terminal 100 or may serve as a passage to allow various command signals inputted by the user from the cradle to be transferred to the mobile communication terminal therethrough. Various command signals or power inputted from the cradle may operate as signals for recognizing that the mobile communication terminal is properly mounted on the cradle.

The controller 180 can control the general operations of the mobile communication terminal. For example, the controller 180 can perform controlling and processing associated with voice calls, data communications, video calls, or other operations. The controller 180 may include a multimedia module 181 for reproducing multimedia data. The multimedia module 181 may be configured within the controller 180 or may be configured to be separated from the controller 180. Also, the controller 180 may perform pattern recognition processing to recognize a handwriting input or a picture drawing input on the touch screen as characters or images. The power supply unit 190 receives external power or internal power and supplies appropriate power required for operating respective elements and components under the control of the controller 180.

Various embodiments described herein may be implemented in a computer-readable medium using, for example, software, hardware, or a combination thereof. For hardware implementations, the techniques described below may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some implementations, functionality may be implemented by the controller 180 itself.

For software implementations, the techniques described below may be implemented by separate software modules. Each software module may perform one or more functions or operations described herein. Software codes can be implemented by a software application written in any suitable programming language. The software codes may be stored in the memory 160 and executed by the controller 180. A voice recognition module 182 recognizes a voice pronounced by the user and performs a corresponding function according to the recognized voice signal.

Figure 3:
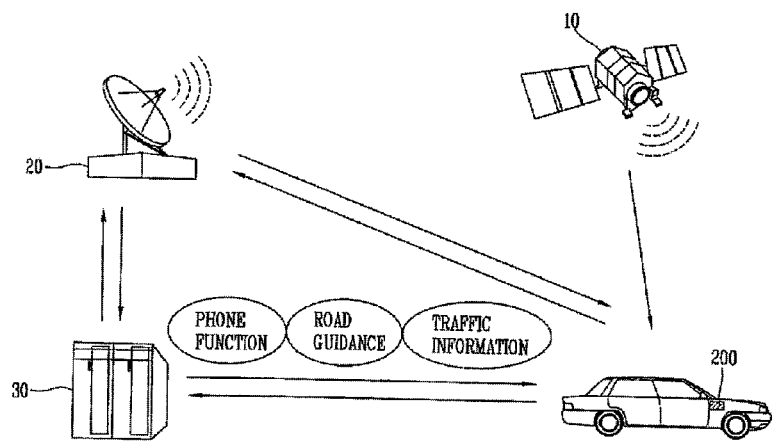
FIG. 3 is a schematic block diagram showing a configuration of a vehicle navigation system.

A navigation session 300 applied to the mobile communication terminal 100 can be used in displaying a traveling route. FIG. 3 is a schematic block diagram showing a configuration of a vehicle navigation system. As shown in FIG. 3, the vehicle navigation system includes an information providing center 30 for providing traffic information and various data (e.g., programs and execution files). A telematics terminal 200 that is mounted within a vehicle, receives traffic information via a remote wireless communication network 20 and/or short-range wireless communication network and provides a road guidance service based on a GPS signal received via a satellite 10 and the traffic information.

Figure 4:
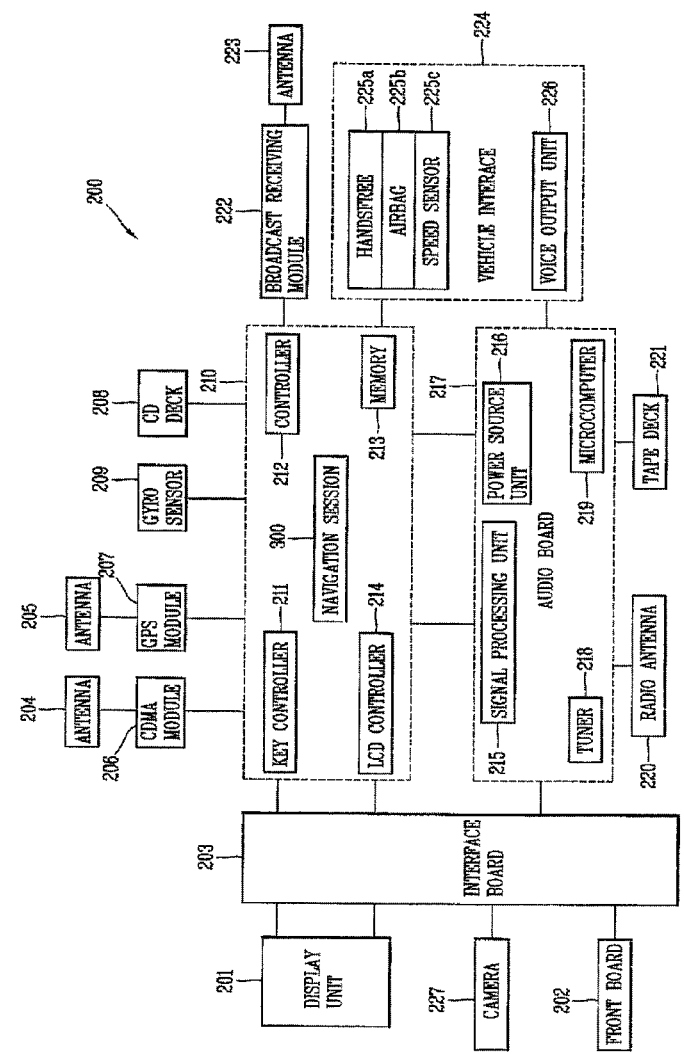
FIG. 4 is a schematic block diagram showing a configuration of a telematics terminal.

The configuration of the telematics terminal 200 according to various implementation is described below with respect to FIG. 4. FIG. 4 is a schematic block diagram showing a configuration of a telematics terminal 200. As shown in FIG. 4, the telematics terminal 200 includes a main board 210 including a CPU (Central Processing Unit) 212 for controlling the telematics terminal 200, a memory 213 for storing various information, a key controller 211 for controlling various key signals, and an LCD controller 214 for controlling an LCD.

The memory 213 stores map information (map data) for displaying road guidance information on a digital map. Also, the memory 213 stores a traffic information collection and control algorithm for allowing inputting of traffic information according to a present condition of a road on which the vehicle is currently traveling by a user.

The main board 210 includes a code division multiple access (CDMA) module 206 and a GPS module 207. The GPS module 2007 can guide a location of the vehicle, receive a GPS signal for tracking a travel route from a start point to a destination, and transmit transmitting traffic information collected by the user as a GPS signal. The main board 210 can also include a CD deck 208 for reproducing a signal recorded in a CD (Compact Disk) and a gyro sensor 209. The CDMA module 206 and the GPS module 207 receive signals via antennas 204 and 205.

A broadcast receiving module 222 is connected with the main board 210 and receives a broadcast signal via an antenna 223. An LCD 201 under the control of the LCD controller 214, a front board 202 under the control of the key controller 211, and a camera 227 for capturing the interior and/or the exterior of a vehicle are connected to the main board 210 via an interface board 203. The LCD 201 displays various video signals and character signals and the front board 202 includes buttons for various key signal inputs and provides a key signal corresponding to a button selected by the user to the main board 210. Also, the LCD 201 can include a proximity sensor and a touch sensor. In addition, the front board 202 includes a menu key for directly inputting traffic information. The menu key may be configured to be controlled by the key controller 211.

An audio board 217 is connected with the main board 210 and processes various audio signals. The audio board 217 includes a microcomputer 219 for controlling the audio board 217, a tuner 218 for receiving a radio signal, a power source unit 216 for supplying power to the microcomputer 219, and a signal processing unit 215 for processing various voice signals. The audio board 217 also includes a radio antenna 220 for receiving a radio signal and a tape deck 221 for reproduce an audio tape. The audio board 217 may further include a voice output unit 226 including, for example, an amplifier, for outputting a voice signal processed by the audio board 217.

The voice output unit 226 is connected to a vehicle interface 224. Namely, the audio board 217 and the main board 210 are connected to the vehicle interface 224. A hands-free unit 225a for inputting a voice signal, an airbag 225b configured for the security of a passenger, and a speed sensor 225c for detecting the speed of the vehicle, may be connected to the vehicle interface 224. The speed sensor 225c calculates a vehicle speed and provides the calculated vehicle speed information to the CPU 212.

The display unit 201 detects a proximity touch within a display window via a proximity sensor. For example, when a pointer (e.g., user's finger or stylus) becomes adjacent or touches the display unit 201, the display unit 201 may detect the position of the proximity touch and output position information corresponding to the detected position to the CPU 212. A voice recognition module 301 recognizes a voice pronounced by the user and performs a corresponding function according to the recognized voice signal.

The navigation session 300 applied to the telematics terminal 200 generates road guidance information based on the map data and current location information of the vehicle and provides the generated road guidance information to a user. The navigation session 300 applied to the telematics terminal 200 displays the traveling route on the map data, and when the location of the mobile communication terminal 100 is within a pre-set distance from a blind spot included in the traveling route, the navigation session 300 automatically forms a wireless network with a terminal (e.g., a vehicle navigation apparatus) mounted in a neighboring vehicle and/or a mobile communication terminal communication terminal carried around by a neighboring pedestrian through radio communication (e.g., a short-range wireless communication network), in order to receive location information from one or more of the terminal mounted in the neighboring vehicle and the mobile communication terminal carried around by the neighboring pedestrian.

Figure 5:
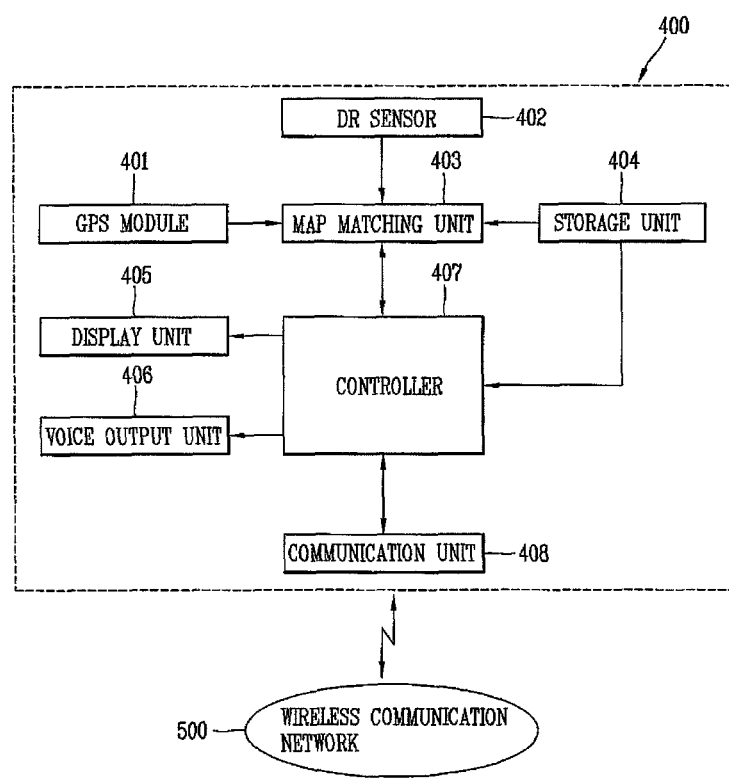
FIG. 5 is a schematic block diagram showing a configuration of a vehicle navigation apparatus.

FIG. 5 is a schematic block diagram showing a configuration of a vehicle navigation apparatus. As shown in FIG. 5, the vehicle navigation apparatus 400 includes a GPS module 401 for receiving a GPS signal from a satellite and generating first vehicle location data of the navigation apparatus (regarded as the same location as the telematics terminal 200 or the mobile communication terminal 100) based on the received GPS signal, a DR (Dead-Reckoning) sensor 402 for generating second vehicle location data based on a travel direction and the speed of a vehicle, a storage unit (or a memory) 404 for storing map data and various information, a map matching unit 403. The map matching unit 403 can be configured to generate an estimated vehicle location based on first and second vehicle location data, match the generated estimated vehicle location and a link in the map data stored in the storage unit 404, and output the matched map information.

The vehicle navigation apparatus 400 also includes a communication unit 408 for receiving real time traffic information from an information providing center and/or a neighboring vehicle via a wireless communication network 500 and performing call communication, a controller 407 for generating road guidance information based on the matched map information, a display unit 405 for displaying a road guide map (including information about an interested place) included in the road guidance information, and a voice output unit 406 for outputting road guidance voice information (road guidance voice message) included in the road guidance information. The communication unit 408 may include a hands-free unit having a Bluetooth module.

The road guidance information may include various information related to traveling, such as lane information, speed limit information, turn-by-turn information, traffic safety information, traffic guidance information, vehicle information, road search information, and map data.

The signal received via the GPS module 401 may be configured to provide the location information of the terminal to the navigation apparatus 400 by using a wireless communication scheme, such as 802.11, a standard of the wireless network for WLAN including wireless LAN, some infrared communication, 802.15, a standard for a wireless personal area network (PAN) including Bluetooth™, UWB, ZigBee, 802.16, a standard for a wireless metropolitan area network (MAN) broadband wireless access (BWA) including a fixed wireless access (FWA), 802.20, a standard for the mobile Internet with respect to a mobile broadband wireless access (MBWA) including WiBro, and WiMAX.

The navigation apparatus 400 may further include an input unit. The input unit may select a user-desired function or receive information and may be implemented using one or more of various devices, such as a keypad, a touch screen, a jog shuttle, or a microphone. The map matching unit 403 generates a vehicle estimated location based on the first and second vehicle location data and reads map data corresponding to a travel route from the storage unit 404.

The map matching unit 403 matches the vehicle estimated location and a link (e.g., road) included in the map data and outputs the matched map information to the controller 407. For example, the map matching unit 403 generates the vehicle estimated location based on the first and second location data, matches the generated vehicle estimated location and links in the map data stored in the storage unit 404 according to the link order, ad outputs the matched map information to the controller 407. The map matching unit 403 may output information regarding road attributes such as a one-lane road or a two-lane road, included in the matched map information. The function of the map matching unit 403 may be implemented in the controller 407.

The storage unit 404 stores map data. In this case, the stored map data includes geographic coordinates representing the latitude and longitude by DMS (Degree/Minute/Second) unit. Here, besides the geographic coordinates, universal transverse mercator (UTM) coordinates, universal polar system (UPS) coordinates, transverse mercator (TM) coordinates, or other coordinate systems may be also used as the stored map data.

The storage unit 404 stores various information such as various menu screen images, a point of interest (POI), function characteristics information according to a particular position of map data, and the like. The storage unit 404 stores various UIs and/or GUIs. The storage unit 404 stores data and programs required for operating the navigation apparatus 400. Also, the storage unit 404 stores destination information inputted from the user via the input unit. The destination information may be a destination and a start point.

The display unit 405 displays image information such as a road guidance map included in the road guidance information generated by the controller 407. Here, the display unit 405 includes a touch sensor and/or a proximity sensor. The road guidance information may include various information in relation to traveling, such as lane information, running limit speed information, turn-by-turn information, traffic safety information, traffic guidance information, vehicle information, road search information, and map data.

When displaying the image information, the display unit 405 may display various contents, such as various menu screen images, and road guidance information by using a UI and/or a GUI included in the storage unit 404. Here, the contents displayed on the display unit 405 may include various text or image data (including map data or various information data), and a menu screen image including data, such as icons, list menus, combo boxes, and the like.

The voice output unit 406 outputs voice information included in road guidance information (or a voice message with respect to the road guidance information) generated by the controller 407. Here, the voice output unit 406 may be an amplifier or a speaker. The controller 407 generates the road guidance information based on the matched map information and outputs the generated road guidance information to the display unit 405 and the voice output unit 406. Then, the display unit 405 displays the road guidance information.

The controller 407 receives real time traffic information from the information providing center and/or a vehicle navigation apparatus mounted in a neighboring vehicle to generate road guidance information. Also, the controller 407 may be connected to a call center via the communication unit 408 to perform call communication or to transmit or receive information between the navigation apparatus 400 and the call center. Here, the communication unit 408 may include a hands-free unit having a Bluetooth™ function using a short-range radio communication scheme.

Figure 6:
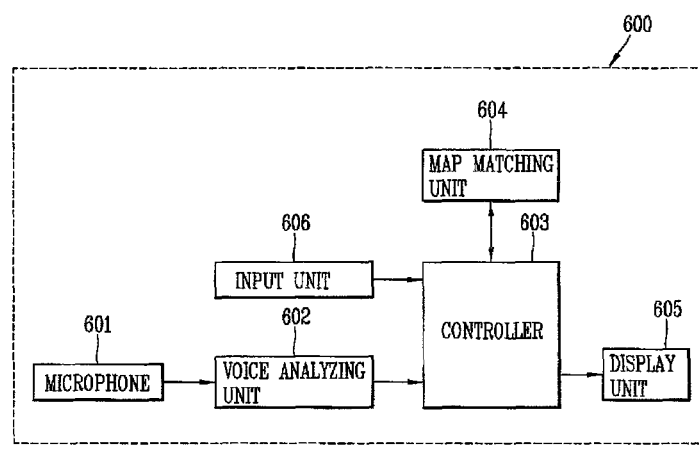
FIG. 6 is a schematic block diagram showing a configuration of a voice processing apparatus of a mobile communication terminal.

A voice processing apparatus and method of the mobile communication terminal is described below with respect to FIG. 6. The voice processing apparatus illustrated in FIG. 6 may be applicable to various terminals, such as smart phones, notebook computers, PDAs, and PMPs. The voice processing apparatus of FIG. 6*may* also be applicable to the mobile communication terminal 100, the telematics terminal 200, and the navigation apparatus 400. FIG. 6 is a schematic block diagram showing a configuration of a voice processing apparatus of a mobile communication terminal.

As shown in FIG. 6, the voice processing apparatus 600 of a mobile communication terminal includes a microphone 601 configured to receive voice, a storage unit 604 configured to store a word list including key words (predetermined words) corresponding to various information, a voice analyzing unit 602 configured to analyze a voice inputted via the microphone 601 during voice call communications to extract word information, a controller 603 configured to detect words consistent with word information extracted by the voice analyzing unit 602 from the key words previously stored in the storage unit 604 and read information linked to the detected words when the voice call communications are terminated, and a display unit 605 configured to display the read information (or an output unit configured to output an image signal or a voice signal corresponding to the read information).

Here, the controller 603 may detect words consistent with the word information which has been extracted by the voice analyzing unit 602 from among the key words previously stored in the storage unit 604 and may enable display of the detected words on the display unit 605 in an order. The order may be, for example, from a word spoken most frequently to a word spoken least frequently. Also, the microphone 601 receives voice from the exterior and converts the received voice into an electrical signal.

The storage unit 604 stores the word list. The word list can include key words (e.g., predetermined words) corresponding to various information. For example, the key words may correspond to an area name, a drama title, a multimedia title, the name of entertainers, or titles of data previously set by the user or downloaded via a wireless communication network. The storage unit 604 may be implemented as flash memory storing various storage data that can be updated together with a phonebook, origination messages, and reception messages in the general mobile communication terminal.

In addition, the storage unit 604 stores information linked to the key words. For example, the storage unit 604 stores various information, such as location information and area information corresponding to particular area names, actor/actress information, music information, and/or movie data and other entertainer information. The various information may be previously stored in the storage unit 604 by the user or may be downloaded from a mobile communication terminal of a friend or an acquaintance or a server via a mobile communication network (e.g., a short-range or remote wireless communication network). Here, the key words and the information linked to the key words may be divided in a table form according to their types. Namely, the controller 603 records words matched to key words which have been previously divided in a table form according to their types, in a corresponding type of table, to allow the user to easily recognize what kind of word the matched word is. For example, when a word consistent with the drama title is detected from a table including 'drama title' items, the controller 603 records and discriminates the detected word in the 'drama title' item.

The voice analyzing unit 602 analyzes a voice inputted via the microphone 601 during voice call communications to extract word information. The voice analyzing unit 602 includes a voice recognition chip formed by integrating a memory and a digital signal processor (DSP). Voice recognition can refer to automatic recognition of voices, and in general, the recognition of phoneme text and sentence sequence from a voice signal. In particular, voice recognition can be a process of recognizing a word or a word sequence based on voice waveforms and extracting its meaning. The voice analyzing unit 602 converts a pronunciation recognized through voice recognition into characters and sequentially combines the characters to form a single word.

The controller 603 detects a word consistent with the word information which has been extracted by the voice analyzing unit 602 from among the key words stored in the storage unit 604, and when the voice call communications are terminated, the controller 603 displays the detected word on the display unit 605. Here, the controller 603 may detect words consistent with the word information which has been extracted by the voice analyzing unit 602 from among the key words stored in the storage unit 604 and display the detected words on the display unit 605, starting from the word with the highest frequency.

Also, the controller 603 extracts information linked to the detected word from the storage unit 604. The controller 603 may be implemented as a microprocessor that controls the general operation of the mobile communication terminal. The controller 603 may display the detected words in a table form on the display unit 605 or may store them in the storage unit 604.

When the voice call communications are terminated, the display unit 605 displays words consistent with the word information which has been extracted by the voice analyzing unit 602, and displays information linked to the detected word. The display unit 605, which may be an LCD, displays state information generated during the operation of the mobile communication terminal and numbers, characters, or symbols which have been inputted by the user via the input unit 606, or video and still images.

The input unit 606 may include number keys from 0 to 9 mounted on the keypad of the mobile communication terminal, and function keys such as a menu key, a call key, an end key, a cancel/delete key, a direction key, and other keys. The input unit 606 generates key input data corresponding to a key pressed by the user of the mobile communication terminal, and provides the generated key input data to the controller 603. Here, the input unit 606 may be implemented as a touch screen function, without being limited to the keypad.

The following description references processes for controlling mobile communication terminals, vehicle navigation apparatus, and/or vehicle navigation systems according to various implementations. Although the process described below reference elements discussed above, this referencing is exemplary. Other elements may be used in conjunction with carrying out the processes described below or portions thereof.

Figure 7:
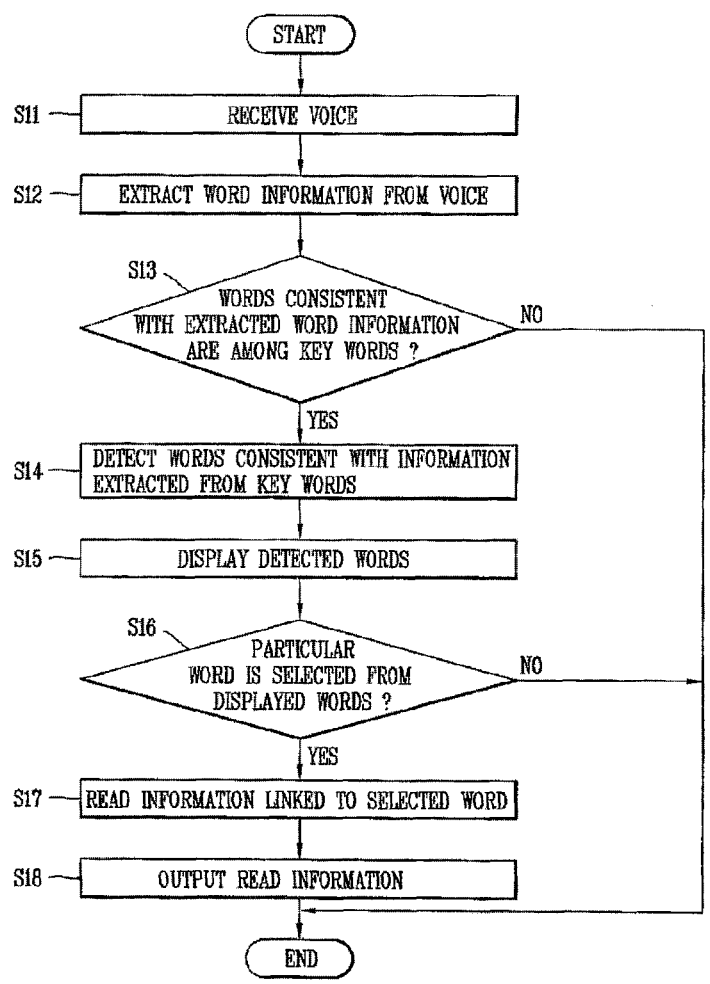
FIG. 7 is a flow chart of a process for voice processing with a mobile communication terminal.

FIG. 7 is a flow chart illustrating a process for voice processing with a mobile communication terminal. Initially, a voice is received (S11). In particular, the microphone 601 receives a voice in a call communication state and outputs the received voice to the voice analyzing unit 602. Then, word information is extracted from the received voice (S12).

In particular, from the extracted word information, a word list can be created. The storage unit 604 stores the word list including key words corresponding to various information. For example, the key words may be a particular area name, a movie, music, or other media title, or the name of an entertainer or celebrity. The key words may be titles of various data previously set by the user or downloaded via a wireless communication network. In addition, the storage unit 604 stores information linked to the key words.

For example, the storage unit 604 stores various information, such as location information and area information corresponding to particular area names, actor/actress information corresponding to a drama title, music corresponding to drama video data or multimedia title, and/or movie data and entertainer information corresponding to entertainer names. The various information may be previously stored in the storage unit 604 by the user or may be downloaded from a mobile communication terminal of a friend or an acquaintance or a server via a mobile communication network (e.g., short-range or remote wireless communication network). Here, the key words and the information linked to the key words may be divided in a table form according to their types. The voice analyzing unit 602 analyzes a voice inputted via the microphone 601 during voice call communications to extract word information, and outputs the extracted word information to the controller 603.

Then, whether words consistent with the extracted word information are among the key words is determined (S13). In particular, the controller 603 determines whether or not a word (or words) consistent with the word information which has been extracted by the voice analyzing unit 602 exists in the key words stored in the storage unit 604. If such words are determined to be among the key words, words consistent with information extracted from key words are detected (S14). In particular, if a word (or words) consistent with the word information which has been extracted by the voice analyzing unit 602 exists in the key words, the controller 603 detects a word (or words) consistent with the word information which has been extracted by the voice analyzing unit 602 from among the key words stored in the storage unit 604. Next, the detected words are displayed (S15). Specifically, when the voice call communications are terminated, the controller 603 displays the detected word (or words) to the display unit 605.

The controller 603 may display the detected words in a table form according to their types. For example, if the detected word is a name of a particular area, the controller 603 displays the detected word at an area item, and if the detected word is a drama title, the controller 603 displays the detected word at a drama item. Here, the controller 603 may display the detected words in the table form on the display unit 605 or may store them in the storage unit 604. The controller 603 may detect words consistent with the word information which has been extracted by the voice analyzing unit 602 from among the key words which have been previously stored in the storage unit 604, and enable display of the detected words on the display unit 605 in an order. In various implementations, the order is starting from a word which has been spoken with a high frequency by the user to a word which has been spoken with a low frequency by the user.

Thereafter, whether a particular word is selected from the displayed words is detected (S16). In particular, the controller 603 determines whether or not the user has selected a particular word from among the detected words via the input unit 606. Then information linked to a selected word is read (S17). In particular, when a particular word is selected by the user, the controller 603 reads information linked to the selected word from the storage unit 604, and outputs the read information to the display unit 605. Thereafter, the read information is output (S18). In particular, when the voice call communications are terminated, the display unit 605 displays the read information.

Figure 8:
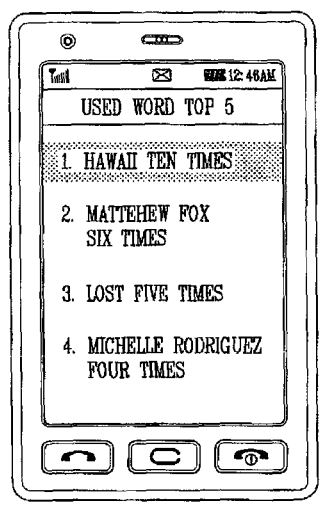
FIG. 8 is an overview of a screen display illustrating detected words.

FIG. 8 is an overview of a screen display illustrating detected words. As shown in FIG. 8, the controller 603 detects words consistent with word information which has been extracted by the voice analyzing unit 602 from among the key words stored in the storage unit 604, and when voice call communications are terminated, the controller 603 displays the detected words on the display unit 605. For example, if an area name such as 'Hawaii', the name of an entertainer (e.g., Matthew Fox), and a drama title (e.g., 'LOST') are detected, the controller 603 displays the detected words on the display unit 605. Here, the controller 603 may sequentially display the words according to the number of frequency of the word which has been spoken (or pronounced) by the user. Namely, if 'Hawaii' is spoken by the user ten times, the controller displays 'Hawaii ten times' on the display unit 605.

Figure 9:
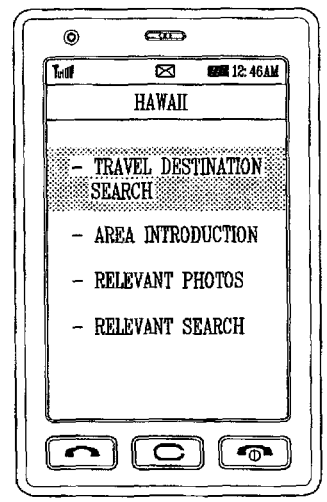
FIGS. 9-11 are overviews of screen displays illustrating menus linked to detected words.

FIG. 9 is an overview of a screen display illustrating a menu linked to a detected word. As shown in FIG. 9, when a particular word (e.g., Hawaii) is selected from among the words displayed on the display unit 605, the controller 603 displays menus related to the selected word. For example, if 'Hawaii' is selected by the user from among the words displayed on the display unit 605, the controller 603 displays travel destinations, area introduction, relevant photos, and relevant search menus in relation to Hawaii on the display unit 605. When a particular menu is selected by the user, the controller 603 reads information linked to the selected menu, and outputs the read information to the display unit 605.

Figure 10:
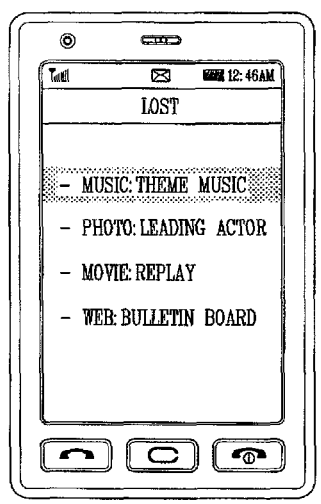

FIG. 10 is an overview of a screen display illustrating a menu linked to a different detected word. As shown in FIG. 10, when a particular word (e.g., 'LOST') is selected by the user from among the words displayed on the display unit 605, the controller 603 displays one or more menus related to the selected word on the display unit 605. For example, when 'LOST', a drama title, is selected by the user from the words displayed on the display unit 605, the controller 603 displays drama theme music, a photo image of a leading actor or actress, drama repeat viewing, bulletin board menus in relation to 'LOST' on the display unit 605. When a particular menu is selected by the user, the controller 603 reads corresponding information linked to the selected menu from the storage unit 604 and outputs the read information to the display unit 605. Here, if the corresponding information linked to the menu which has been selected by the user is information linked to a server, rather than existing in the storage unit 604, the controller 603 connects to the server via the communication unit 607, downloads the corresponding information from the server and outputs the downloaded corresponding information.

Figure 11:
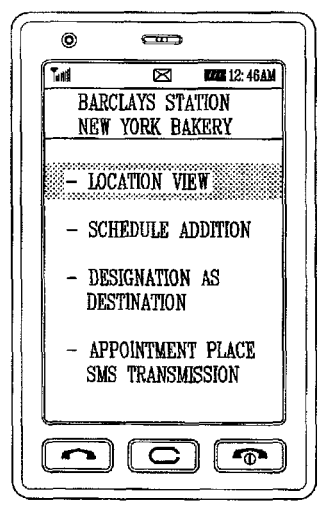

FIG. 11 is an overview of a screen display illustrating a menu linked to a further detected word. As shown in FIG. 11, when a particular word or phrase (e.g., Barclays Station New York Bakery) is selected by the user from among the words displayed on the display unit 605, the controller 603 displays menus related to the selected word on the display unit 605. For example, when the name of a bakery, "Barclays Station New York Bakery," is selected by the user from among the words or phrases displayed on the display unit 605, the controller 603 displays menus of a location view, schedule addition (e.g., designating as a place to see), designation as destination, and an appointment place short message service (SMS) transmission in relation to the 'Barclays Station New York Bakery' on the display unit 605.

When a particular menu is selected by the user from the menus, the controller 603 reads corresponding information linked to the selected menu from the storage unit 604 and outputs the read information to the display unit 605. Here, if the 'schedule addition menu' is selected by the user, the controller 603 records the 'Barclays Station New York Bakery' in a schedule list. If the 'menu of designation as destination' is selected, the controller 603 sets the 'Barclays Station New York Bakery' as a destination. If the 'appointment place SMS transmission menu' is selected, the controller 603 generates a message indicating that the 'Barclays Station New York Bakery' is designated as an appointment place.

Figure 12:
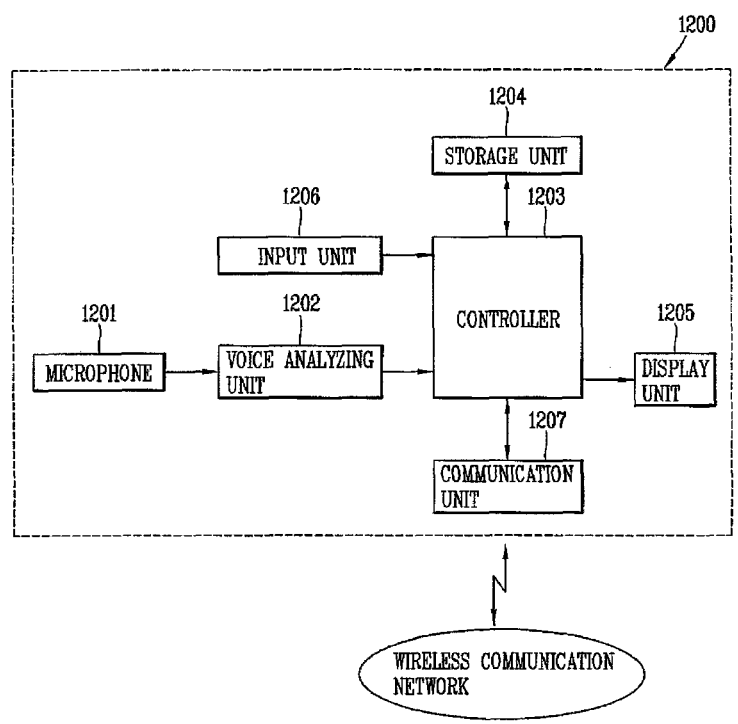
FIG. 12 is a schematic block diagram showing a configuration of a voice processing apparatus of a mobile communication terminal.

FIG. 12 is a schematic block diagram showing a configuration of a voice processing apparatus of a mobile communication terminal. As shown in FIG. 12, the voice processing apparatus 1200 of a mobile communication terminal according to a second exemplary embodiment of the present invention includes a microphone 1201 configured to receive voice, a storage unit 1204 configured to store a word list including key words corresponding to various information, a voice analyzing unit 1202 configured to analyze a voice inputted via the microphone 1201 during voice call communications to extract word information, and a controller 1203. The controller 1203 is configured to detect words consistent with word information extracted by the voice analyzing unit 1202 from the key words previously stored in the storage unit 1204 and to read information linked to the detected words when the voice call communications are terminated.

The voice processing apparatus 1200 also includes a display unit 1205 configured to display the read information, and a communication unit 1207 configured to receive the information linked to the detected word from a server via a wireless communication network and output the received information to the controller 1203. Here, if the information linked to the detected word does not exist in the storage unit 1204, the controller 1203 may download information associated with the detected word from the server via the communication unit 1207, and display the downloaded information on the display unit 1205.

The configuration of the voice processing apparatus of the mobile communication terminal according to various further implementations is discussed in further detail below. First, the microphone 1201 receives voice from the exterior and converts the received voice into an electrical signal. The storage unit 1204 stores the word list including key words (predetermined words) corresponding to various information. For example, the key words may correspond to a particular area name, a drama title, a multimedia title, the name of entertainers, or titles of data previously set by the user or downloaded via a wireless communication network. The storage unit 1204 may be implemented as flash memory storing various storage data that can be updated together with a phonebook, origination messages, and reception messages in the general mobile communication terminal.

In addition, the storage unit 1204 stores information linked to the key words. For example, the storage unit 1204 stores various information, such as location information and area information corresponding to particular area names, actor/actress information, music information, and/or movie data and other entertainer information. The various information may be previously stored in the storage unit 1204 by the user or may be downloaded from a the server via a mobile communication network. Here, the key words and the information linked to the key words may be divided in a table form according to their types.

The voice analyzing unit 1202 analyzes a voice inputted via the microphone 601 during voice call communications to extract word information. The voice analyzing unit 602 includes a voice recognition chip formed by integrating a memory and a DSP. Voice recognition can refer to automatic recognition of phoneme text and sentence sequence from a voice signal.

The controller 1203 detects a word consistent with the word information which has been extracted by the voice analyzing unit 1202 from among the key words stored in the storage unit 1204, and when the voice call communications are terminated, the controller 1203 displays the detected word on the display unit 1205. Here, the controller 1203 may detect words consistent with the word information which has been extracted by the voice analyzing unit 1202 from among the key words stored in the storage unit 604 and display the detected words on the display unit 1205, starting from the word with the highest frequency.

Also, the controller 1203 extracts information linked to the detected word from the storage unit 1204. The controller 603 may be implemented as a microprocessor that controls the general operation of the mobile communication terminal. The controller 1203 may display the detected words in a table form on the display unit 1205 or may store them in the storage unit 604. When the voice call communications are terminated, the display unit 1205 displays words consistent with the word information which has been extracted by the voice analyzing unit 1202, and displays information linked to the detected word.

The input unit 1206 generates key input data corresponding to a key pressed by the user of the mobile communication terminal and provides the generated key input data to the controller 1203. The communication unit 1207 receives the information linked to the detected word from the server via the wireless communication network and outputs the received information to the controller 1203. Here, if information linked to the detected word does not exist in the storage unit 1204, the controller 1203 downloads information associated with the detected word from the server via the communication unit 1207, and displays the downloaded information on the display unit 1205.

Figure 13:
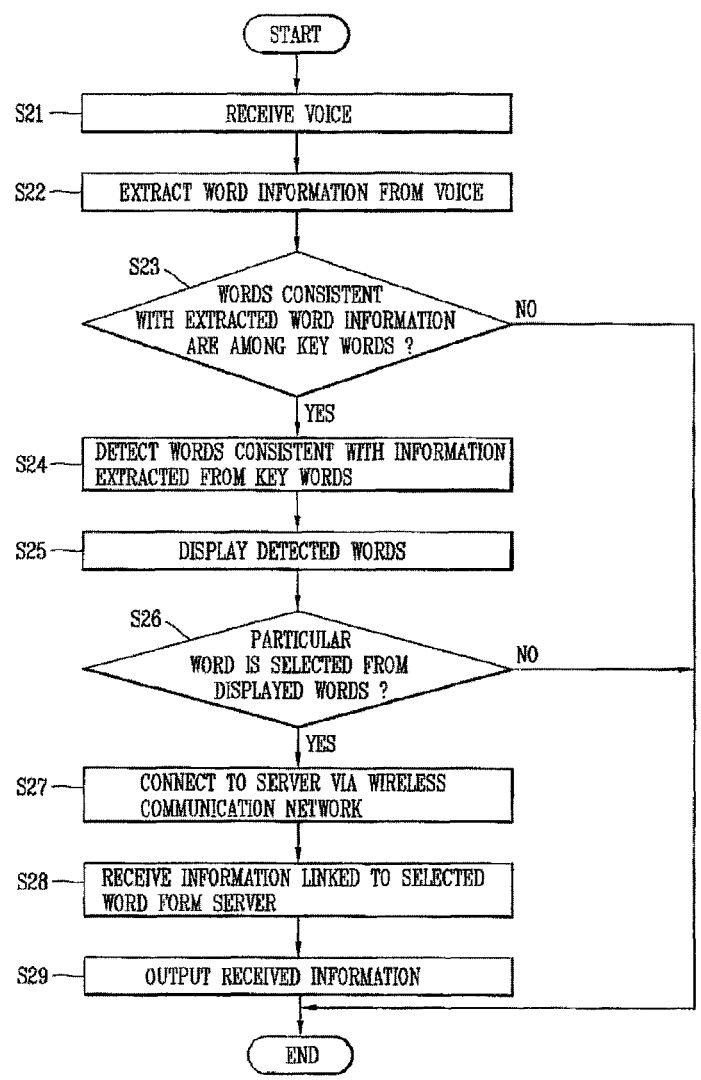
FIG. 13 is a flow chart of a process for voice processing with a mobile communication terminal.

FIG. 13 is a flow chart illustrating a process for voice processing with a mobile communication terminal. The process of FIG. 13 can be conducted using, for example, the mobile communication terminal of FIG. 12 or other devices.

Initially, a voice is received (S21). In particular, the microphone 1201 receives a voice from the exterior in a call communication state and outputs the received voice to the voice analyzing unit 1202. Then, word information is extracted from the received voice (S22).

In particular, from the extracted word information, a word list can be created. The storage unit 1204 stores the word list including key words corresponding to various information. For example, the key words may be a particular area name, a movie, music, or other media, or the name of an entertainer or celebrity. The key words may be titles of various data previously set by the user or downloaded via a wireless communication network. In addition, the storage unit 1204 stores information linked to the key words. For example, the storage unit 1204 stores various information, such as location information and area information corresponding to particular area names, actor/actress information, music information, and/or movie data and other entertainer information.

The various information may be previously stored in the storage unit 604 by the user or may be downloaded from a mobile communication terminal of a friend or an acquaintance or a server via a mobile communication network (e.g., short-range or remote wireless communication network). Here, the key words and the information linked to the key words may be divided in a table form according to their types. The voice analyzing unit 1202 analyzes a voice inputted via the microphone 1201 during voice call communications to extract word information, and outputs the extracted word information to the controller 1203.

Then, whether words consistent with the extracted word information are among the key words is determined (S23). In particular, the controller 1203 determines whether or not a word (or words) consistent with the word information which has been extracted by the voice analyzing unit 1202 exists in the key words stored in the storage unit 1204. If such words are determined to be among the key words, words consistent with information extracted from key words are detected (S24). In particular, if a word (or words) consistent with the word information which has been extracted by the voice analyzing unit 1202 exists in the key words, the controller 1203 detects a word (or words) consistent with the word information which has been extracted by the voice analyzing unit 1202 from among the key words stored in the storage unit 1204.

Next, the detected words are displayed (S25). Specifically, when the voice call communications are terminated, the controller 1203 displays the detected word (or words) to the display unit 1205 Here, the controller 1203 may display the detected words in a table form according to their types. For example, if the detected word is a name of a particular area, the controller 1203 displays the detected word at an area item, and if the detected word is a drama title, the controller 1203 displays the detected word at a drama item. Here, the controller 1203 may display the detected words in the table form on the display unit 1205 or may store them in the storage unit 1204. The controller 1203 may detect words consistent with the word information which has been extracted by the voice analyzing unit 1202 from among the key words which have been previously stored in the storage unit 1204, and enable display of the detected words on the display unit 1205 in an order. In various implementations, the order is starting from a word which has been spoken with a high frequency by the user to a word which has been spoken with a low frequency by the user.

Thereafter, whether a particular word is selected from the displayed words is detected (S26). In particular, the controller 1203 determines whether or not the user has selected a particular word from among the detected words via the input unit 1206. If a particular word is selected by the user, the controller 1203 determines whether or not information linked to the selected word exists in the storage unit 1204. If information linked to the word which has been selected by the user exists in the storage unit 1204, the controller 1203 reads the linked information from the storage unit 1204, and outputs the read information to the display unit 1205

Next, if a particular word is detected as selected from the displayed words, then a connection to a server via a wireless network is made (S27). In particular, if the information linked to the word which has been selected by the user does not exist in the storage unit 1204, the controller 1203 controls the communication unit 1207 so as to connect to the server via the wireless communication network. Then, information linked to the selected word is received from the server (S28). In particular, under the control of the controller 1203, the communication unit 1207 receives the information linked to the word which has been selected by the user from the server and outputs the received information to the controller 1203. Here, the 'linked information' which has been received from the server may be information corresponding to an Internet site address or other Internet based information linked to the word which has been selected by the user.

Finally, the received information is output (S29). In particular, the controller 1203 outputs the 'information linked to the word which has been selected by the user' received from the server to the display unit 1205. At this time, the display unit 1205 displays the 'information linked to the word which has been selected by the user' on the screen.

Various implementation have been described above. Some of these implementation may perform part or all of the following functionality. A word list including predetermined words is stored, a voice inputted via the microphone during voice call communications is analyzed to extract word information, words consistent with the word information which has been extracted by the voice analyzing unit are detected from the predetermined words, information linked to the detected words is read, and the read information is outputted. Accordingly, the user's desired and interested information can be variably provided without complicated device manipulation. Namely, user call content is analyzed and corresponding information is actively provided to the user, thereby variably providing interested information desired by the user without complicated device manipulation.

As the description above may be embodied in various forms without departing from the characteristics thereof, it should also be understood that the above-described implementations are not limited by any of the details of the foregoing description, unless otherwise specified, but rather, should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method comprising:
    enabling voice communication by first and second users in a voice communication session that facilitates communication between a first device through which a first user communicates and a second device through which a second user communicates;
    monitoring words spoken in the voice communication session between the first device and the second device;
    determining, from the monitored words spoken in the voice communication session, presence of multiple key words, that are selected from words previously set by the first or second users, as a subset of less than all of the monitored words spoken in the voice communication session, wherein determining the presence of the multiple key words comprises:
        counting the number of occurrences of the monitored words spoken in the communication session between the first device and the second device, and
        identifying, based on the counted number of occurrences of the monitored words, the subset of the monitored words as the multiple key words; and
    displaying, on a display screen of the first device, the multiple key words in a table according to their types, the multiple key words being arranged according to at least three types with key words for each type being sequentially ordered and displayed with the number of frequency of the multiple key words,
    receiving, from among the multiple key words displayed on the display screen of the first device, a user selection of a first key word;
    based on the user selection of the first key word, identifying a first set of search menus that are related to the first key word and that are applicable to a type of the first key word;
    based on identification of the first set of search menus that are related to the first key word and that are applicable to a type of the first key word, displaying, on the display screen, the first set of search menus related to the first key word that is selected from the words previously set by the first or second users, when the first key word of the displayed one or more key words is selected by the first or second users; and
    displaying, on the display screen, information associated with a menu, when the menu of the first set of search menus is selected, wherein the information associated with the menu is location information and area information corresponding to the first key word that is selected from the words previously set by the first or second users.

2. The method of claim 1 wherein enabling voice communication includes initiating the voice communication session between the first user using the first device and the second user using the second device.

3. The method of claim 1 wherein enabling voice communication includes receiving a call initiated using the second device.

4. The method of claim 1 wherein monitoring words spoken in the voice communication session between the first device and the second device includes monitoring, by the first device, words spoken by the first user and communicated through the first device during the voice communication session.

5. The method of claim 1 wherein monitoring words spoken in the voice communication session between the first device and the second device includes monitoring, by the first device, words spoken by the second user and communicated through the second device during the voice communication session.

6. The method of claim 1 wherein:
    determining the presence of the multiple key words includes monitoring the number of instances a word is detected; and
    displaying the one or more key words includes displaying one or more words spoken by the second user and communicated through the second device on the display screen of the first device.

7. The method of claim 1 further comprising:
    storing, during the voice communication session, an indication of the multiple key words; and
    accessing, after the voice communication session has ended, the stored indication of the multiple key words,
    wherein displaying the multiple key words includes displaying information based on the accessed indication of the multiple key words.

8. The method of claim 1 further comprising:
    accessing, based on the user selection of the first key word, information associated with the first key word; and
    displaying, on the display screen, the accessed information associated with the first key word.

9. The method of claim 1 further comprising:
    sending, based on the user selection of the first key word and over a communication network, a request for content associated with the first key word;
    retrieving, from across the communication network, information associated with the first key word; and displaying, on the display screen, the retrieved information associated with the first key word.

10. The method of claim 1 further comprising accessing, from a computer-readable storage medium, a list of stored words, wherein:
  determining the presence of the multiple key words includes comparing the monitored words spoken in the communication session between the first device and the second device with at least some of the words in the list of stored words accessed from the computer-readable storage medium.

11. The method of claim 1 further comprising organizing, based on the counted number of occurrences of the monitored words, the multiple key words, wherein:
  displaying the multiple key words includes displaying, based on the organizing of the multiple key words, the multiple key words in an order from most occurrences to least occurrences.

12. A mobile communication terminal comprising:
  a communication unit configured to enable voice communication by first and second users in a voice communication session that facilitates communication between a first device through which a first user communicates and a second device through which a second user communicates;
  a display; and
  a controller configured to:
    monitor words spoken in the voice communication session between the first device and the second device,
    determine, from the monitored words spoken in the voice communication session, presence of multiple key words, that are selected from words previously set by the first or second users, as a subset of less than all of the monitored words spoken in the voice communication session, wherein determining the presence of the multiple key words comprises:
      counting the number of occurrences of the monitored words spoken in the communication session between the first device and the second device, and
      identifying, based on the counted number of occurrences of the monitored words, the subset of the monitored words as the multiple key words,
    enable display, on the display, of the multiple key words in a table according to their types, the multiple key words being arranged according to at least three types with key words for each type being sequentially ordered and displayed with the number of frequency of the multiple key words;
    receive, from among the multiple key words displayed on the display screen of the first device, a user selection of a first key word;
    based on the user selection of the first key word, identify a first set of search menus that are related to the first key word and that are applicable to a type of the first key word;
    based on identification of the first set of search menus that are related to the first key word and that are applicable to a type of the first key word, display, on the display, the first set of search menus related to the first key word that is selected from the words previously set by the first or second users, when the first key word of the displayed one or more key words is selected by the first or second users; and
    display, on the display, information associated with a menu, when the menu of the first set of search menus is selected, wherein the information associated with the menu is location information and area information corresponding to the first key word that is selected from the words previously set by the first or second users.

13. The terminal of claim 12 wherein, to enable voice communication, the communication unit is configured to initiate the voice communication session between the first user using the first device and the second user using the second device.

14. The terminal of claim 12 wherein, to enable voice communication, the communication unit is configured to receive a call initiated using the second device.

15. The terminal of claim 12 wherein, to monitor words spoken in the voice communication session between the first device and the second device, the controller is configured to monitor words spoken by the first user and communicated through the first device during the voice communication session.

16. The terminal of claim 12 wherein, to monitor words spoken in the voice communication session between the first device and the second device, the controller is configured to monitor words spoken by the second user and communicated through the second device during the voice communication session.

17. The terminal of claim 12 wherein, to determine the presence of the multiple key words, the controller is configured to:
  monitor the number of instances a word is detected; and
  display the multiple key words includes displaying one or more words spoken by the second user and communicated through the second device on the display screen of the first device.

18. The terminal of claim 12 further comprising a computer-readable storage medium, wherein the controller is configured to:
  store, during the voice communication session, an indication of the multiple key words;
  access, after the voice communication session has ended, the stored indication of the multiple key words; and
  enable display, on the display, of information based on the accessed indication of the multiple key words.

19. The terminal of claim 12 wherein the controller is configured to:
  access, based on the user selection of the first key word, information associated with the first key word; and
  enable display, on the display, of the accessed information associated with the first key word.

20. The terminal of claim 12 wherein the controller is configured to:
  send, based on the user selection of the first key word and over a communication network, a request for content associated with the first key word;
  retrieve, from across the communication network, information associated with the first key word; and
  enable display, on the display, of the retrieved information associated with the first key word.

21. The terminal of claim 12 further comprising a computer-readable storage medium storing a list of words, wherein, to determine the presence of the multiple key words, the controller is configured to compare the monitored words spoken in the communication session between the first device and the second device with at least some of the words in the list of words stored in the computer-readable storage medium.

22. The terminal of claim 12 wherein:
the controller is configured to organize, based on the counted number of occurrences of the monitored words, the multiple key words; and
to enable display of the multiple key words, the controller is configured to enable display, based on the organizing of the multiple key words, of the multiple key words in an order from most occurrences to least occurrences.

23. A mobile communication terminal comprising:
a memory configured to store a word list including predetermined words;
a voice analyzer configured to analyze a voice inputted via a microphone during voice call communications to extract word information;
a display; and
a controller configured to:
  determine, from the extracted word information in the voice call communications, presence of multiple key words, that are selected from words previously set by a first user or a second user, as a subset of less than all words spoken in the voice call communications, wherein determining the presence of the multiple key words comprises:
    counting the number of occurrences of monitored words spoken in the voice call communications, and
    identifying, based on the counted number of occurrences of the monitored words, the subset of the monitored words as the multiple key words; and
  display, on the display, the multiple key words in a table according to their types, the multiple key words being arranged according to at least three types with key words for each type being sequentially ordered and displayed with the number of frequency of the multiple key words,
  receive, from among the multiple key words displayed on the display screen of the first device, a user selection of a first key word;
  based on the user selection of the first key word, identify a first set of search menus that are related to the first key word and that are applicable to a type of the first key word;
  based on identification of the first set of search menus that are related to the first key word and that are applicable to a type of the first key word, display, on the display, the first set of search menus related to the first key word that is selected from the words previously set by the first or second users, when the first key word of the displayed one or more key words is selected by the first or second users; and
  display, on the display, information associated with a menu, when the menu of the first set of search menus is selected, wherein the information associated with the menu is location information and area information corresponding to the first key word that is selected from the words previously set by the first or second users.

\* \* \* \* \*